United States Patent
Stelmar Netto et al.

(10) Patent No.: US 10,958,828 B2
(45) Date of Patent: Mar. 23, 2021

(54) ADVISING IMAGE ACQUISITION BASED ON EXISTING TRAINING SETS

(71) Applicant: International Business Machines Corporation, Armonk, NY (US)

(72) Inventors: Marco Aurelio Stelmar Netto, Sao Paulo (BR); Andrea Britto Mattos Lima, Sao Paulo (BR); Maysa Malfiza Garcia de Macedo, Sao Paulo (BR); Maciel Zortea, Rio de Janeiro (BR); Igor Cerqueira Oliveira, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/157,057

(22) Filed: Oct. 10, 2018

(65) Prior Publication Data
US 2020/0120267 A1    Apr. 16, 2020

(51) Int. Cl.
*H04N 5/232*      (2006.01)
*G06K 9/62*      (2006.01)
(Continued)

(52) U.S. Cl.
CPC ..... *H04N 5/23222* (2013.01); *G06K 9/00657* (2013.01); *G06K 9/036* (2013.01);
(Continued)

(58) Field of Classification Search
CPC ......... G06T 7/0012; G06T 2207/30192; G06T 2207/30188; G06T 2207/30108;
(Continued)

(56) References Cited

U.S. PATENT DOCUMENTS

| 5,606,850 A | 3/1997 | Nakamura |
| 5,635,725 A | 6/1997 | Cooper |

(Continued)

FOREIGN PATENT DOCUMENTS

CN     104076408 A     10/2014

OTHER PUBLICATIONS

Yamamoto et al., "On Plant Detection of Intact Tomato Fruits Using Image Analysis and Machine Learning Methods", 2014 © Sensors, ISSN: 1424-8220 (Year: 2014).*

(Continued)

*Primary Examiner* — Dramos Kalapodas
(74) *Attorney, Agent, or Firm* — Joseph Petrokaitis; Otterstedt, Wallace & Kammer, LLP

(57) ABSTRACT

A method for improving the performance of a computer vision system includes obtaining input specifying a task to be performed by the computer vision system; obtaining a first digital image; and comparing the first digital image to at least one training image used to train the computer vision system to solve the task. Further steps include, based on the comparing indicating that the first digital image is insufficiently similar to the at least one training image, recommending at least one adjustment to the digital image; obtaining a second digital image in accordance with the adjustment; and performing the task with the computer vision system based on the second digital image obtained in accordance with the adjustment. Adjustments can be based, for example, on image composition and/or weather conditions.

20 Claims, 7 Drawing Sheets

(51) Int. Cl.
*G06K 9/03* (2006.01)
*G06T 7/00* (2017.01)
*G06K 9/00* (2006.01)
G05D 1/00 (2006.01)
G05D 1/10 (2006.01)
B64C 39/02 (2006.01)

(52) U.S. Cl.
CPC ......... *G06K 9/6215* (2013.01); *G06K 9/6256* (2013.01); *G06T 7/0012* (2013.01); *H04N 5/23299* (2018.08); B64C 39/024 (2013.01); B64C 2201/127 (2013.01); G05D 1/0011 (2013.01); G05D 1/101 (2013.01); G06K 2209/17 (2013.01); G06T 2207/10032 (2013.01); G06T 2207/30188 (2013.01); G06T 2207/30192 (2013.01); H04N 5/23296 (2013.01)

(58) Field of Classification Search
CPC ......... G06T 7/0004; G06T 2207/30204; B64C 39/024; B64C 2201/127; G05D 1/0011; G05D 1/101; G06K 9/036; G06K 9/6215; G06K 9/00657; G06K 9/6256; G06K 2209/17; G06K 9/00718; G06K 9/00744; G06K 9/00221; G06K 9/46; G06K 9/00315; G06K 9/00268; H04N 5/23299; H04N 5/23222; H04N 5/23296; H04N 5/23293; H04N 5/23216; H04N 5/23219
See application file for complete search history.

(56) References Cited

U.S. PATENT DOCUMENTS

| | | | |
|---|---|---|---|
| 5,774,747 A | 6/1998 | Ishihara | |
| 6,067,112 A | 5/2000 | Wellner | |
| 6,101,291 A | 8/2000 | Arney | |
| 6,301,440 B1 | 10/2001 | Bolle | |
| 6,636,260 B2 | 10/2003 | Kiyokawa | |
| 6,930,718 B2 | 8/2005 | Parulski | |
| 6,970,199 B2 | 11/2005 | Venturino | |
| 6,989,859 B2 | 1/2006 | Parulski | |
| 7,058,197 B1 | 6/2006 | McGuire | |
| 7,333,963 B2 | 2/2008 | Widrow | |
| 9,667,860 B2 | 5/2017 | Hakim | |
| 9,686,338 B1* | 6/2017 | Farrell | H04L 65/80 |
| 10,070,050 B2* | 9/2018 | De Bayser | H04N 5/23216 |
| 2002/0176638 A1 | 11/2002 | Stone | |
| 2004/0190789 A1 | 9/2004 | Liu | |
| 2004/0263639 A1 | 12/2004 | Sadovsky | |
| 2005/0231625 A1 | 10/2005 | Parulski | |
| 2006/0034602 A1 | 2/2006 | Fukui | |
| 2007/0065857 A1 | 3/2007 | Glaser | |
| 2008/0194928 A1 | 8/2008 | Bandic | |
| 2010/0045816 A1 | 2/2010 | Rhoads | |
| 2010/0100540 A1 | 4/2010 | Davis | |
| 2010/0277411 A1 | 11/2010 | Yee | |
| 2012/0054658 A1 | 3/2012 | Chuat | |
| 2013/0129196 A1* | 5/2013 | Paris | G06K 9/6256 382/155 |
| 2014/0009636 A1* | 1/2014 | Lee | H04N 5/23212 348/222.1 |
| 2014/0079297 A1* | 3/2014 | Tadayon | G06K 9/00 382/118 |
| 2015/0229838 A1 | 8/2015 | Hakim | |
| 2015/0254800 A1* | 9/2015 | Johnson | G06Q 50/02 382/141 |
| 2016/0127641 A1* | 5/2016 | Gove | H04N 5/23206 348/143 |
| 2016/0182814 A1* | 6/2016 | Schwesinger | H04N 7/147 348/14.03 |
| 2017/0363885 A1* | 12/2017 | Blum | G03B 13/10 |
| 2018/0114068 A1* | 4/2018 | Balasundaram | G06T 7/143 |
| 2018/0367752 A1* | 12/2018 | Donsbach | G06K 9/66 |
| 2019/0149725 A1* | 5/2019 | Adato | H04N 5/23206 348/158 |
| 2019/0163985 A1* | 5/2019 | Wang | G06K 9/00778 |
| 2019/0180143 A1* | 6/2019 | Lyu | G06K 9/6256 |

OTHER PUBLICATIONS

Yamamoto et al., "On Plant Detection of Intact Tomato Fruits Using Image Analysis and Machine Learning Methods", 2014 © Sensors, ISSN: 1424-8220 (Year: 2014) (Year: 2014).*

Peter Mell and Timothy Grance, The NIST Definition of Cloud Computing, NIST Special Publication 800-145 Sep. 2011, 7 pages total.

* cited by examiner

ADVISING IMAGE ACQUISITION BASED ON EXISTING TRAINING SETS

BACKGROUND

The present invention relates to the electrical, electronic and computer arts, and more specifically, to artificial intelligence, machine learning, and machine reasoning and application of same to computer vision and the like.

Computer vision algorithms have become popular recently due to the amount of data being generated and the processing power available to detect patterns.

One pertinent aspect that limits computer vision algorithms in some industries is the lack of proper image acquisition, which is impacted by the device being used, the person handling the device, and the environment (light, position, etc.) in which the image was acquired. It is not uncommon to observe a mismatch between training data sets and the testing image due to these factors.

SUMMARY

Principles of the invention provide techniques for advising image acquisition based on existing training sets. In one aspect, an exemplary method for improving the performance of a computer vision system includes the steps of obtaining input specifying a task to be performed by the computer vision system; obtaining a first digital image; comparing the first digital image to at least one training image used to train the computer vision system to solve the task; based on the comparing indicating that the first digital image is insufficiently similar to the at least one training image, recommending at least one adjustment to the digital image; obtaining a second digital image in accordance with the adjustment; and performing the task with the computer vision system based on the second digital image obtained in accordance with the adjustment.

In another aspect, an exemplary computer vision system includes a memory; an image receiver; and at least one processor, coupled to the memory and the image receiver. The at least one processor is operative to obtain input specifying a task to be performed by the computer vision system; obtain a first digital image via the image receiver; compare the first digital image to at least one training image used to train the computer vision system to solve the task; based on the comparing indicating that the first digital image is insufficiently similar to the at least one training image, recommend at least one adjustment to the digital image; obtain a second digital image in accordance with the adjustment; and perform the task with the computer vision system based on the second digital image obtained in accordance with the adjustment.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

reduced mismatch between training and testing images, with concomitant better performance of computer vision;

because the user receives feedback during image acquisition, the resulting images are more likely to capture relevant details of the scene photographed;

the acquired images can have fewer occlusions on relevant image portions;

image acquisition takes into account external inputs, such as weather/environment conditions; and image acquisition takes into account previous acquisitions comparing several indexes such as intensity patterns and extracted features.

These and other features and advantages of the present invention will become apparent from the following detailed description of illustrative embodiments thereof, which is to be read in connection with the accompanying drawings.

DETAILED DESCRIPTION

Figure 1:
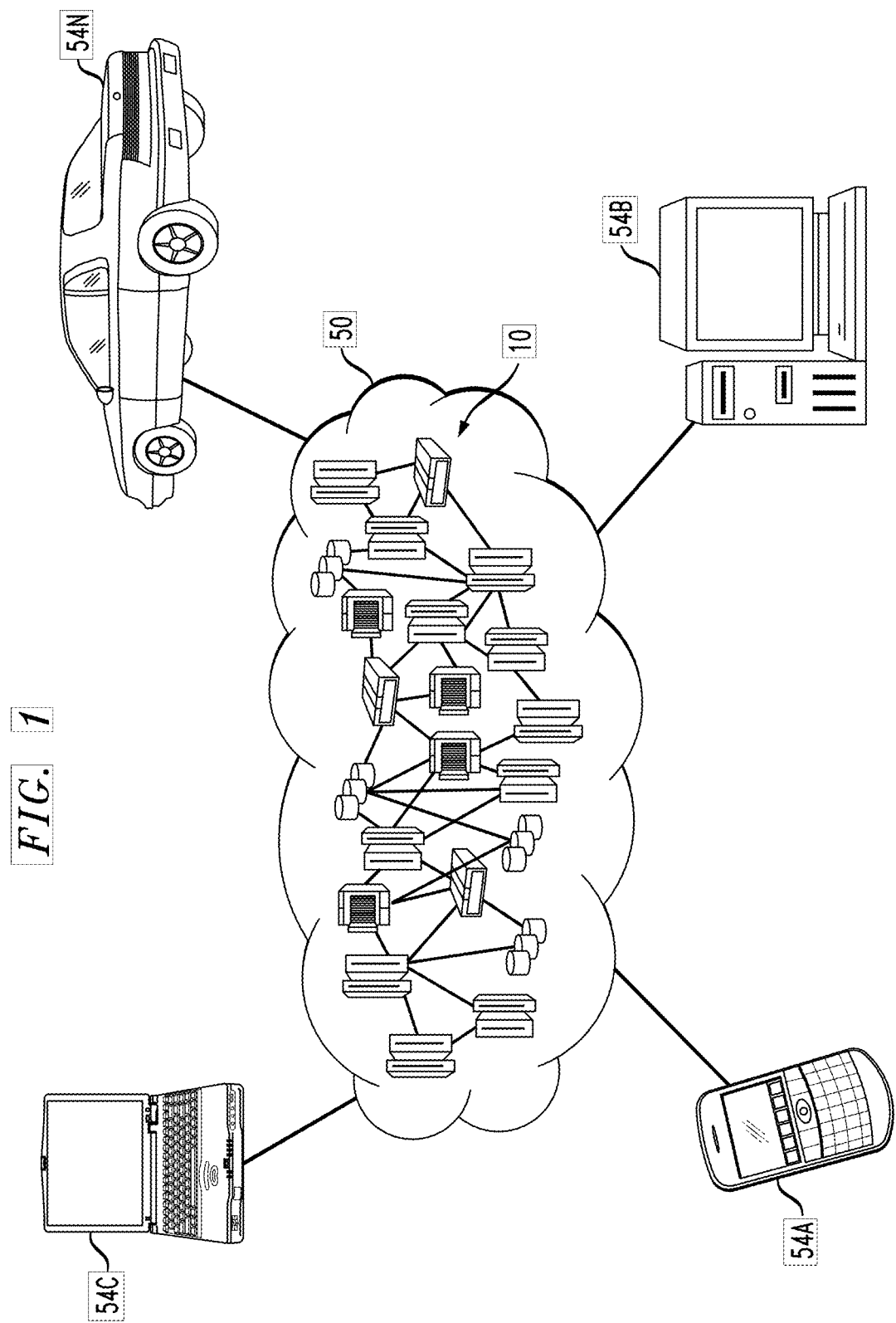
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
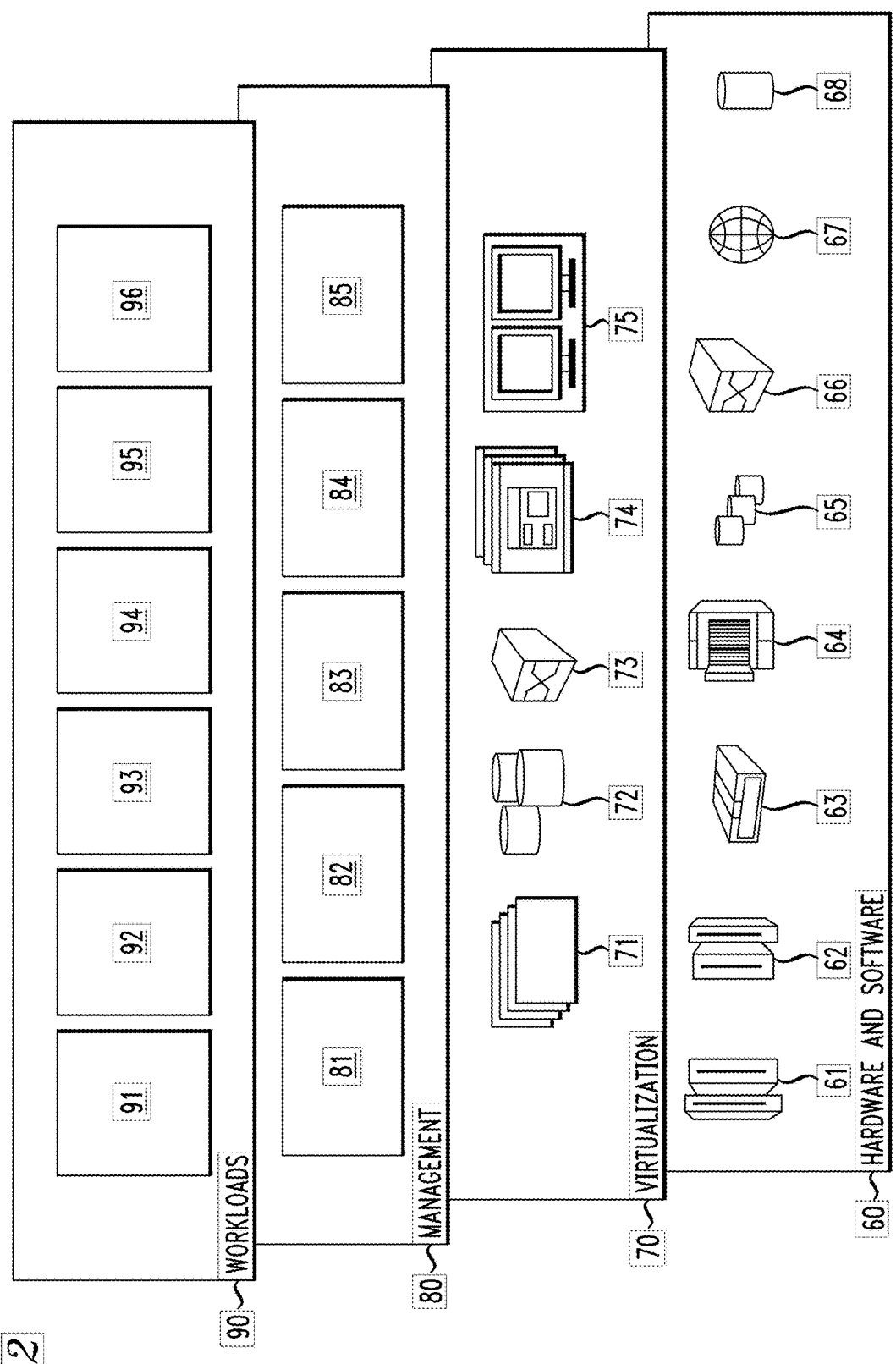
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud-based portions of a system for advising image acquisition based on existing training sets 96.

As noted, computer vision algorithms have become popular recently due to the amount of data being generated and the processing power available to detect patterns. As also noted, one pertinent aspect that limits computer vision algorithms in some industries is the lack of proper image acquisition, which is impacted by the device being used, the person handling the device, and the environment (light, position, etc.) in which the image was acquired. It is not uncommon to observe a mismatch between training data sets and the testing image due to these factors.

One or more embodiments advantageously provide a system that suggests the proper handling of a device to capture images in order to reduce the mismatch between training and testing images. Non-limiting exemplary use cases include a fruit counter or a disease detector. For example, there is an existing training set with several images taken in similar conditions of lighting, composition, etc. When the user is acquiring new images for testing purposes, the system will provide feedback (such as movements of the camera) to make the new image more similar to the existing training set and/or will suggest a new time for image acquisition when the weather conditions are more favorable.

Suppose that a user takes a photo of a tree of interest. The photo is to be analyzed afterwards using computerized methods (for example, to count pieces of fruit). At the time of photo acquisition, one pertinent question is to know whether the quality of the photo is good or not for the future task (detailed analysis). In this context, the detailed analysis could be, for example, to count the number of pieces of fruit in the photo, estimate the size of each piece of fruit, estimate fruit quality and ripening, diagnose fruit disease, identify and document pests attacking the fruit, diagnose leaf disease, estimate the size of leaves, among others. In one or more embodiments, the system has a database with examples of good quality images showing the type of trees of interest. This database may contain examples of trees showing uncluttered fruits/diseases/etc. acquired in good conditions. The system uses these images to judge the suitability of the new image acquired.

Figure 4B:
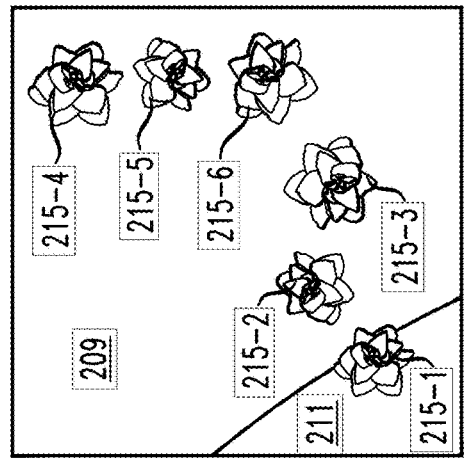
FIG. 4B is a line drawing representative of a photo of the subject of FIG. 4A wherein aspects of the invention recommend a new image acquisition via zooming out.
Figure 4A:
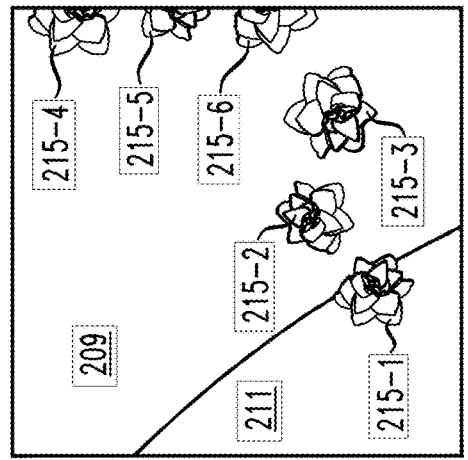
FIG. 4A is a line drawing representative of a photo wherein flowers and/or pieces of fruit are too close to the image border.
Figure 3:
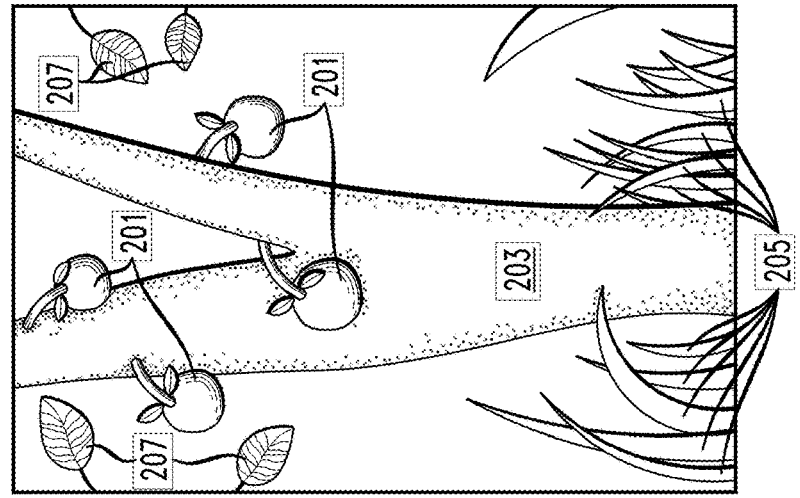
FIG. 3 is a line drawing representative of a photo wherein pieces of fruit are present without substantial occlusions by leaves.

Refer to FIG. 3. The system analyses the photo and detects the presence of pieces of fruit 201 associated with bifurcated tree trunk 203 without substantial occlusions by leaves 205, 207. Therefore, the system indicates to the user that the collected image seems to be fine for further analysis (e.g. fruit counting). Now consider FIG. 4A. The system analyses the photo and suspects the presence of flowers/pieces of fruit too close to the image borders. For illustrative convenience, only flowers 215-1, 215-2, 215-3, 215-4, 215-5, and 215-6 are depicted, but they are equally representative of pieces of fruit. There is also a tree trunk 209 and background region 211. Flowers 215-4, 215-5, and 215-6 are too close to the image border. Therefore, the system recommends a new image acquisition "zoom out." The new acquisition is resubmitted and accepted as in FIG. 4B. Flowers 215-4, 215-5, and 215-6 are now spaced sufficiently from the image border, while flowers 215-1, 215-2, and 215-3 remain visible within the border as well.

Heretofore, systems have not advised an operator regarding how to take a photo in order to visually approximate the photo to an image set used for training computer vision algorithms. One or more embodiments advantageously provide a system and/or method to advise image acquisition (i.e., guide the process of image acquisition) based on existing training images, in order to increase the chances of match between the testing and training images. The solution involves providing on-the-fly feedback to the user holding a camera (directly or via another device such as a drone), based on properties of the training data sets and the image exposed to the camera. The feedback is related to the position of the camera and/or drone, the weather conditions under which the images should be acquired, and adjustment(s) to the environment to minimize/solve object occlusions.

Figure 5:
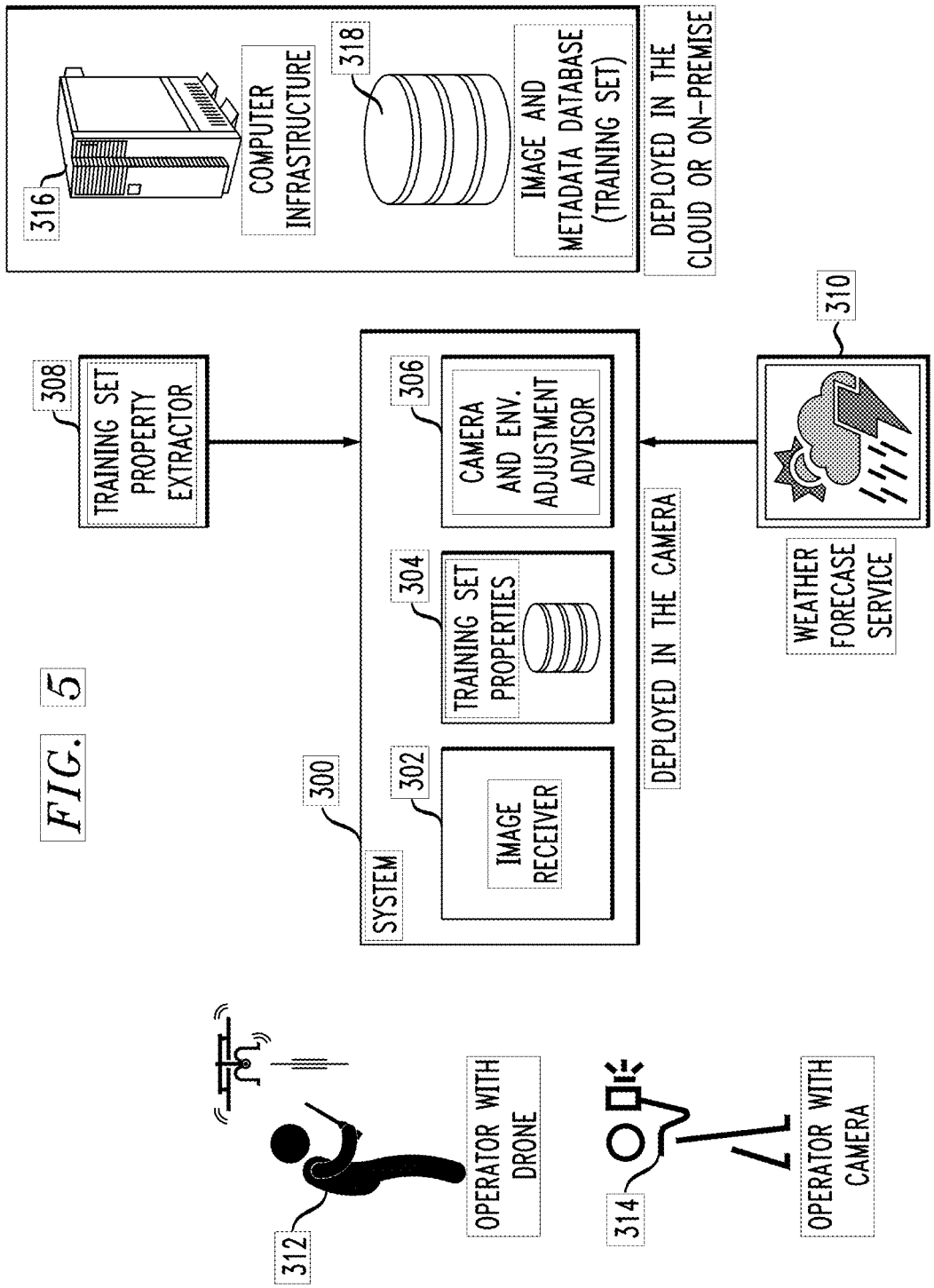
FIG. 5 is a system block diagram, according to an aspect of the invention.

Referring to the system block diagram of FIG. 5, the operator refers to a person or system handling the device that acquires images; the operator may use, for example, a drone, as seen at 312, and/or a handheld or tripod-mounted camera, as at 314. A drone is a device that carries a camera for aerial images, and a camera is a device that captures images; e.g., digital images of visible light or light in a different part of the spectrum (e.g., infrared). The image receiver 302 is the part of the system that receives the image taken by the camera. The training set properties 304 are representations of the images from the training set (example color, texture, and shape descriptors).

In one or more embodiments, system 300 resides in the camera. The camera will be equipped with a processor (e.g. a smart phone camera; refer to discussion of FIG. 8). In one or more embodiments, the image receiver 302 can be, for example, a CCD or CMOS image sensor. In one or more non-limiting examples, the training set properties are data stored in non-volatile memory, and the advisor is a piece of software that encodes the algorithm for giving the photographer advice to move the camera and/or await another light condition to take the photo.

The camera and environment adjustment advisor 306 is the component responsible for giving user feedback on the acquired image to increase the match against the training set images. The training set property extractor 308 extracts properties of the training set images. The computer infrastructure 316 includes a computer, network, and storage to execute the training set property extractor. The Image and Metadata Database 318 includes images and metadata used to train the model for computer vision algorithms. In one or more embodiments, metadata is mainly used to represent the context in which the images where taken (e.g. weather properties such as cloud cover, moisture, temperature, luminosity, and time). The weather forecast service 310 is, for example, an Internet-based weather forecast service.

In one or more embodiments, elements 316, 318, and 308 reside in the cloud workload layer 90 as shown at 96. In one or more embodiments, the cloud environment hosts the service and infrastructure/data required for deployment of the service. Other platforms to have this service could be used in other embodiments, however.

Figure 6:
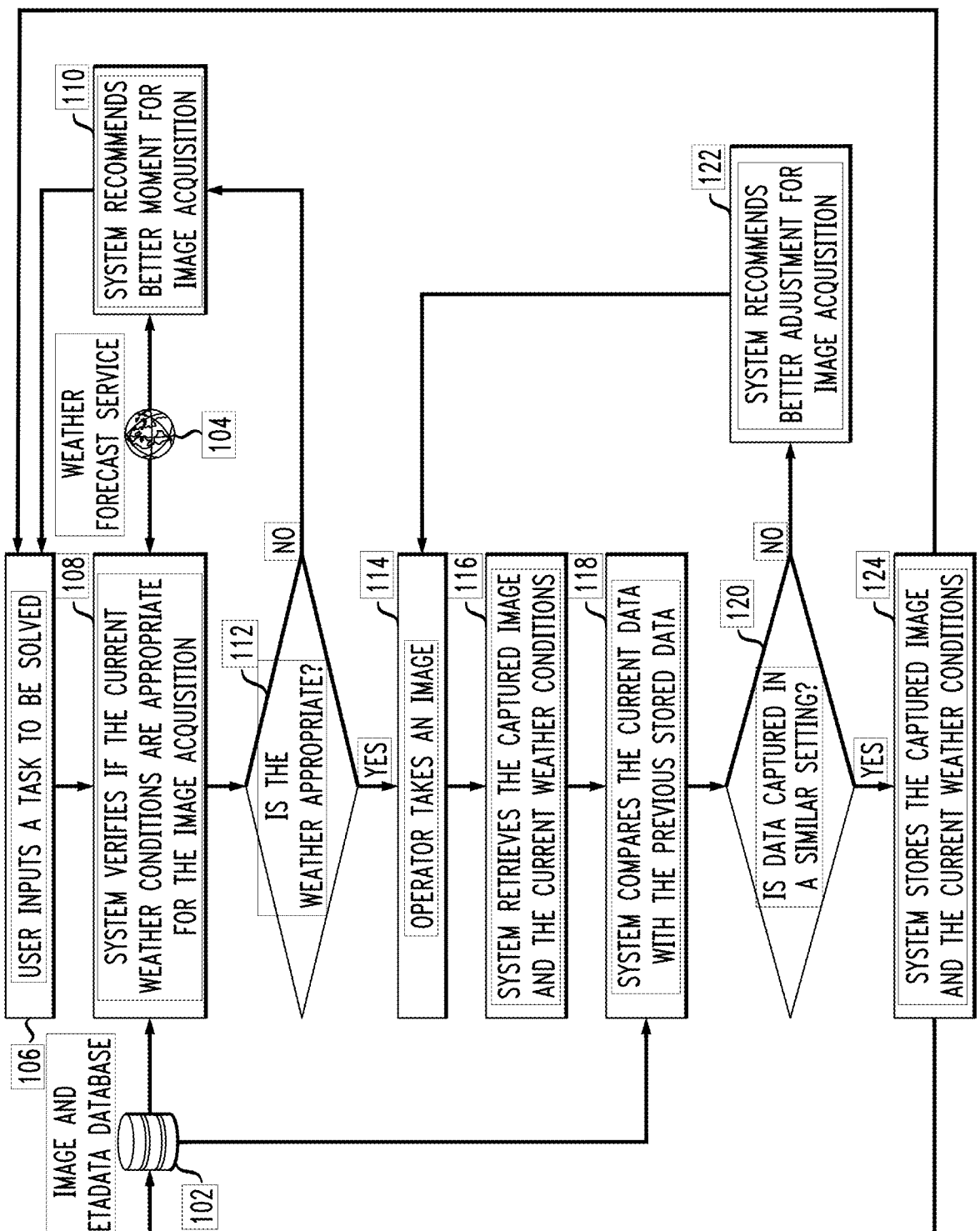
FIG. 6 is a flow chart, according to an aspect of the invention.

With continued reference to FIG. 5 and referring now also to the flow chart of FIG. 6, in step 106, a user inputs (e.g. to system 300 residing on the camera) a task to be solved; for example, the user can select the application ("app") to classify an image (such as to check for plant/fruit disease). Use is made of the image and metadata database 102 (same as 318), which includes images and metadata used to train the model for computer vision algorithms. In one or more embodiments, metadata is mainly used to represent the context in which the images were taken (e.g. weather properties such as cloud cover, moisture, temperature, luminosity, and time). Use is also made of the weather forecast service 104 (same as 310) (e.g., an Internet-based weather forecast service). Step 108 includes a weather query; the system 300 queries metadata on database 102 and compares same with data provided by service 104. In decision block 112, the system 300 determines whether the current weather conditions are appropriate; if not, as at the "no" branch, proceed to the environmental advisor 110; this component considers the metadata that have just been queried and consults the weather prediction from service 104 to recommend the best time to acquire a new image. Thus, in decision block 112, if the captured current data is compatible (to be in a range of possible values) with stored metadata, the system allows the image acquisition, otherwise, it requests a new acquisition according to the recommended settings. Logical flow proceeds from step/block 110 back to step 106; eventually, whether on the first pass or a subsequent pass, it can be assumed that decision block 112 will yield a "yes" and logical flow proceeds to step 114.

Step 114 includes image acquisition; the operator (human or device) acquires a (new) image. In step 116, image capture and current weather conditions, the system 116 acquires a new image and associates it to the current weather conditions that have just been queried. In step 118, image query, the system 300 queries the image training set on database 102 and compares the captured image with the training set using features such as color, texture, and shape descriptors. In decision block 120, image comparison, a determination is made whether the captured image is compatible (to be in a range of possible values) with the training set (i.e. captured in a similar setting). If so ("yes" branch), the system allows the data storage at 124 (captured image and current weather conditions), otherwise, it does not allow for any storage ("no" branch step 122 wherein system 300 recommends a better adjustment for image acquisition).

In step 122, the camera and environmental adjustment advisor 306 recommends camera adjustments (such as position) that minimize the difference between appropriate metrics up to a minimal threshold value. This component 306 together with steps 114, 116, 118 and 120 continuously compare(s) metrics (such as image histograms) of the training set and the image being acquired. Non-limiting examples of the aforementioned appropriate metrics include the difference between the histogram of the new image and the images in the training set; the difference between the probability that the captured image contains occluded objects and the same probability computed for the set of reference training images; the probability associated with the location of objects in the frame (e.g. is object too close to the image border?); presence of certain colors and textures in the acquired image); and the like.

In step 124, storage, store the new image and the current weather condition in database 102; logical flow then returns to step 106.

One or more embodiments provide feedback for the user (regarding camera adjustment and acquisition moment (time and date)) so the user himself/herself can take pictures that are more similar to a training set of images, given a specific computer vision-based task. In one or more embodiments, the user does not provide feedback; on the contrary, the user receives feedback for taking pictures in order to approximate them to the conditions of a training set previously acquired. Also, the feedback from one or more embodiments goes beyond tilt, pan and zoom adjustment only; the feedback may consider, for instance, climate/weather conditions. One or more embodiments focus on industrial applications and provide feedback regarding camera adjustment for taking pictures at similar conditions of a training dataset. One possible type of feedback considers illumination conditions; however, several other types of feedback are possible (for example, camera and/or environment adjustment).

It will be appreciated that pertinent aspects of one or more embodiments include matchmaking against training sets and/or camera adjustment feedback according to training sets. One or more embodiments advise the operator on how to take the photo in order to visually approximate it to an image set that will be used for training computer vision algorithms. In one or more embodiments, user feedback is not requested, instead, the operator is instructed on how to take the image properly—the operator is advised according to the best way the image should be captured. For example, two images are visually approximated, and input is provided regarding how to take the second image for increasing visual similarity with the first. In one or more embodiments, meteorological information is used to advise the operator on how to take images according to a training dataset. In one or more embodiments, adjustments to equipment are made according to system feedback rather than the user's judgment. One or more instances advantageously consider the visual attributes required for approximating the input image to a training dataset that will be used for solving a specific computer vision task. One or more instances advise the user on how to position the camera in order to capture an image. On or more embodiments not only provide feedback for a user on how to capture an image for the task of recognizing an object, but further take external information into account (e.g., weather data) to approximate the input image to a training set that may be used for solving computer vision tasks other than object recognition.

One or more instances offer a set of image parameters based on an image database, in order to keep a pattern according to the previous images taken. One or more embodiments guide the user to achieve a set of parameters closer to the trained model. One or more instances address the suitability of an image for a computer vision task.

In a non-limiting example, a machine learning or artificial intelligence system (for example, a convolutional neural network) is trained on training images to recognize external features of objects that may be the subject of the computer vision task, so that they can be appropriately classified (e.g., piece of fruit, healthy fruit, diseased fruit). The skilled artisan will be familiar with the desirable object position.

Given the teachings herein, the skilled artisan will be able to decide about suitable weather or object position to acquire a digital image, so that system 300 will be able to determine whether an image to be used for the computer vision task is sufficiently close to the corresponding training image(s) by computing a correlation function, the root of the mean square-error, using distance-based functions, and the like (e.g., via feature extraction and comparison). In one or more embodiments, the system does not need to teach the operator 312, 314 regarding how to select the best feature extractor; this is part of the machine learning procedure that is computed automatically from the training data.

Given the discussion thus far, it will be appreciated that an exemplary method for improving the performance of a computer vision system, according to an aspect of the invention, includes the step 106 of obtaining input specifying a task to be performed by the computer vision system. This step can be performed, for example, by the user 312, 314 interacting with the system 300 via a suitable graphical user interface (GUI). An additional step 114 includes obtaining a first digital image. This step can be carried out, for example, with image receiver 302 and a suitable lens system, in a well-known manner. A still further step 118 includes system 300 comparing the first digital image to at least one training image used to train the computer vision system to solve the task; the result is provided to decision block 120. Note that the comparison typically relies on information from the database 102; this is suggested by the arrow pointing from 102 to 108; an arrow could also be drawn from 102 to 112 but is omitted to avoid clutter.

An even further step (NO branch of decision block 120 with logical flow to step 122) includes, based on the comparing indicating that the first digital image is insufficiently similar to the at least one training image, recommending at least one adjustment to the digital image. The recommendation can be provided, for example, using camera and environment adjustment advisor 306. Advisor 306 recommends camera adjustments (such as position) that minimize the difference between the metrics (e.g., color, texture, and shape descriptors) associated with the first digital image and the at least one training image up to a minimal threshold value. Once the new image is acquired, a series of attributes are computed from its full area or parts or individual portions of the image (e.g. quadrants). The objective is to extract information to quantify the presence of certain, textures, and geometric attributes, such as the presence of edges in the images, elliptical shapes, etc. Once these attributes are computed, they can be numerically compared with the same attributes computed beforehand in a reference database.

Yet a further step (repeated step 114 with logical flow from 122) includes obtaining a second digital image in accordance with the adjustment. This step can be carried out, for example, with image receiver 302 and a suitable lens system, in a well-known manner. An even further step includes performing the task with the computer vision system based on the second digital image obtained in accordance with the adjustment. One or more embodiments may be used for any application in remote sensing that requires image capturing and posterior automatic analysis. Besides fruit counting/disease detection, approximating train and test images can be useful for crop identification, tree crown delimitation, productivity estimation, etc. Moreover, images acquired using one or more embodiments can be of relevance to analyze images acquired in settings other than agricultural, such as in medical settings. For instance, if the patient is not well positioned during acquisition, the system can recommend a new image acquisition, before the image arrives to the expert doctor that needs to look at it. In each case, improvement is expected, as compared to prior-art techniques, since the acquired image is more similar to the image used to train the system.

At least some embodiments include the further step 108, 112 of, prior to obtaining the first digital image, determining whether current weather conditions are appropriate, based on weather conditions when the at least one training image was taken (e.g. with advisor 306). A further step includes, responsive to the determining indicating that the current weather conditions are not appropriate (NO branch of decision block 112 to step 110), recommending a subsequent time for obtaining the first digital image. The first digital image is then obtained at the subsequent time. In one or more embodiments, component 306 uses the information from the Weather Forecast Service 310 to recommend the moment where the weather is more likely to be similar to the one when the training images where captured.

In some instances, a further step 108, 112 includes, prior to obtaining the first digital image, determining whether current weather conditions are appropriate, based on weather conditions when the at least one training image was taken. In one or more embodiments, comparisons are performed in 306 using metadata. The first digital image is then obtained in response to the determining indicating that the current weather conditions are appropriate (yes branch of decision block 112).

In one or more embodiments, a further step 116 includes associating the current weather conditions with the first digital image. In one or more embodiments, the weather is stored as metadata but it is also used for comparison with the image to be acquired and images in the training set as weather has a direct impact on the images look like. The weather information and association with image is performed, for example, by system 300 using database 318 in FIG. 3. The weather information is simply stored, for example, so the system can verify if future acquisitions are made in similar weather conditions.

The current weather conditions (and those of the training images) can be measured, for example, by at least one of cloud cover, moisture (e.g. relative or specific humidity), temperature (dry bulb and/or wet bulb in degrees C., F, K, or R), luminosity, and time of day—it is generally relevant to save the date, time of acquisition and the geographic coordinates. Cloud coverage can be received, for example, from the weather forecast service and satellite images. In one or more embodiments, the system is configured to advise the user on how to adjust luminosity. A camera-equipped device 1013, discussed below, may include, for example, a GPS receiver to determine geographic coordinates, and on-board clock to determine time of day, an on-board calendar to determine date.

Non-limiting examples of computer vision tasks that can be improved by aspects of the invention include crop identification, fruit counting, agricultural disease prediction, fruit size estimation, fruit quality estimation, fruit ripening estimation, crop pest identification, agricultural disease diagnosis, and leaf size estimation.

Various adjustments can be carried out to change the image composition; for example, pan, tilt, and/or zoom. In some cases, recommending the at least one adjustment to the digital image includes displaying directions to a human user (e.g. 314) operating at least one of a camera and an unmanned aerial vehicle.

In some cases, as depicted at 312, at least a portion of the computer vision system which obtains the first and second digital images (e.g. lens system and CCD or CMOS device) is mounted on an unmanned aerial vehicle (drone), and the adjustment (which can change the image composition) includes at least one of pitch, yaw, roll, and translation (i.e. flying/hovering closer to or further from the object to be photographed). In some cases, recommending the at least one adjustment to the digital image includes wirelessly controlling the unmanned aerial vehicle.

In another aspect, an exemplary computer vision system 300 includes a memory 28 and/or 512; an image receiver 302; and at least one processor 16 and/or 502, coupled to the memory and the image receiver, and operative to obtain input specifying a task to be performed by the computer vision system (e.g. via a user interface); obtain a first digital image via the image receiver; and compare the first digital image to at least one training image (e.g. in database 304) used to train the computer vision system to solve the task. The at least one processor is further operative to, based on the comparing indicating that the first digital image is insufficiently similar to the at least one training image, recommend at least one adjustment to the digital image (e.g. using advisor 306); to obtain a second digital image, via the image receiver, in accordance with the adjustment; and perform the task with the computer vision system based on the second digital image obtained in accordance with the adjustment.

In one or more embodiments, the at least one processor is further operable to, prior to obtaining the first digital image, determine whether current weather conditions are appropriate, based on weather conditions when the at least one training image was taken (e.g. using data from 310 and stored training image data/metadata); and, responsive to the determining indicating that the current weather conditions are not appropriate, recommend a subsequent time for obtaining the first digital image (e.g. using component 306). The first digital image is then obtained at the recommended subsequent time.

The current weather conditions can be measured, for example, by at least one of cloud cover, moisture, temperature, luminosity, and time of day.

In some instances, the at least one processor is further operable to, prior to obtaining the first digital image, determine whether current weather conditions are appropriate, based on weather conditions when the at least one training image was taken. The first digital image is then obtained in response to the determining indicating that the current weather conditions are appropriate.

In one or more embodiments, the at least one processor is further operable to associate the current weather conditions with the first digital image. The current weather conditions can be measured, for example, by at least one of cloud cover, moisture, temperature, luminosity, and time of day.

The task can include, by way of example and not limitation, at least one of crop identification, fruit counting, agricultural disease prediction, fruit size estimation, fruit quality estimation, fruit ripening estimation, crop pest identification, agricultural disease diagnosis, and leaf size estimation.

Figure 7:
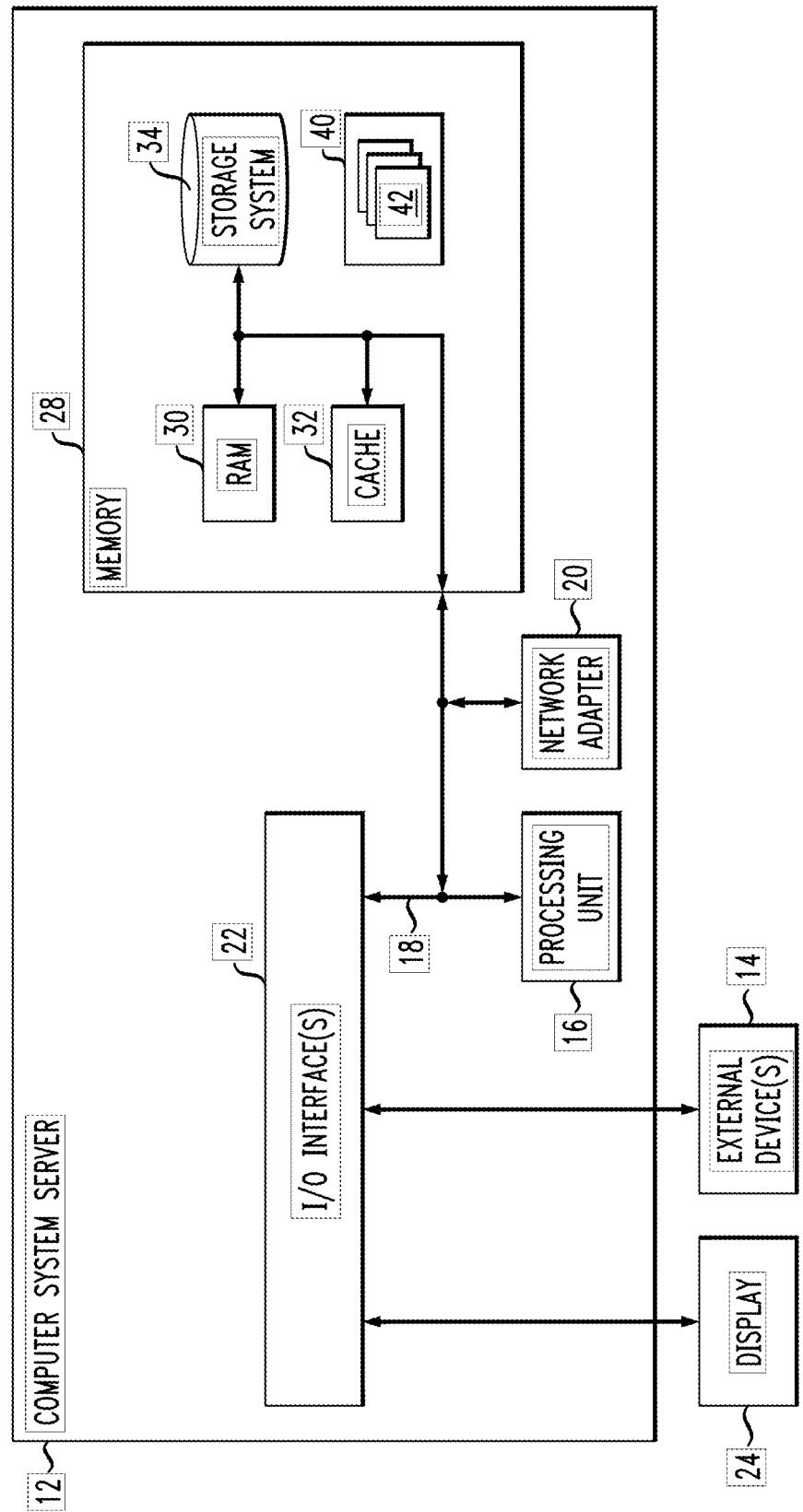
FIG. 7 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., components 308, 316, 318 in layer 90 as shown at 96.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16 and/or 502 (discussed below). Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI). In this manner, in one or more embodiments, the user selects the task to be solved? Typically, the task to be solved (e.g., tree counting) should be defined before the image acquisition, so a GUI based on html served out by a server may be preferable to an on-camera GUI deployment.

Exemplary Mobile Device

Figure 8:
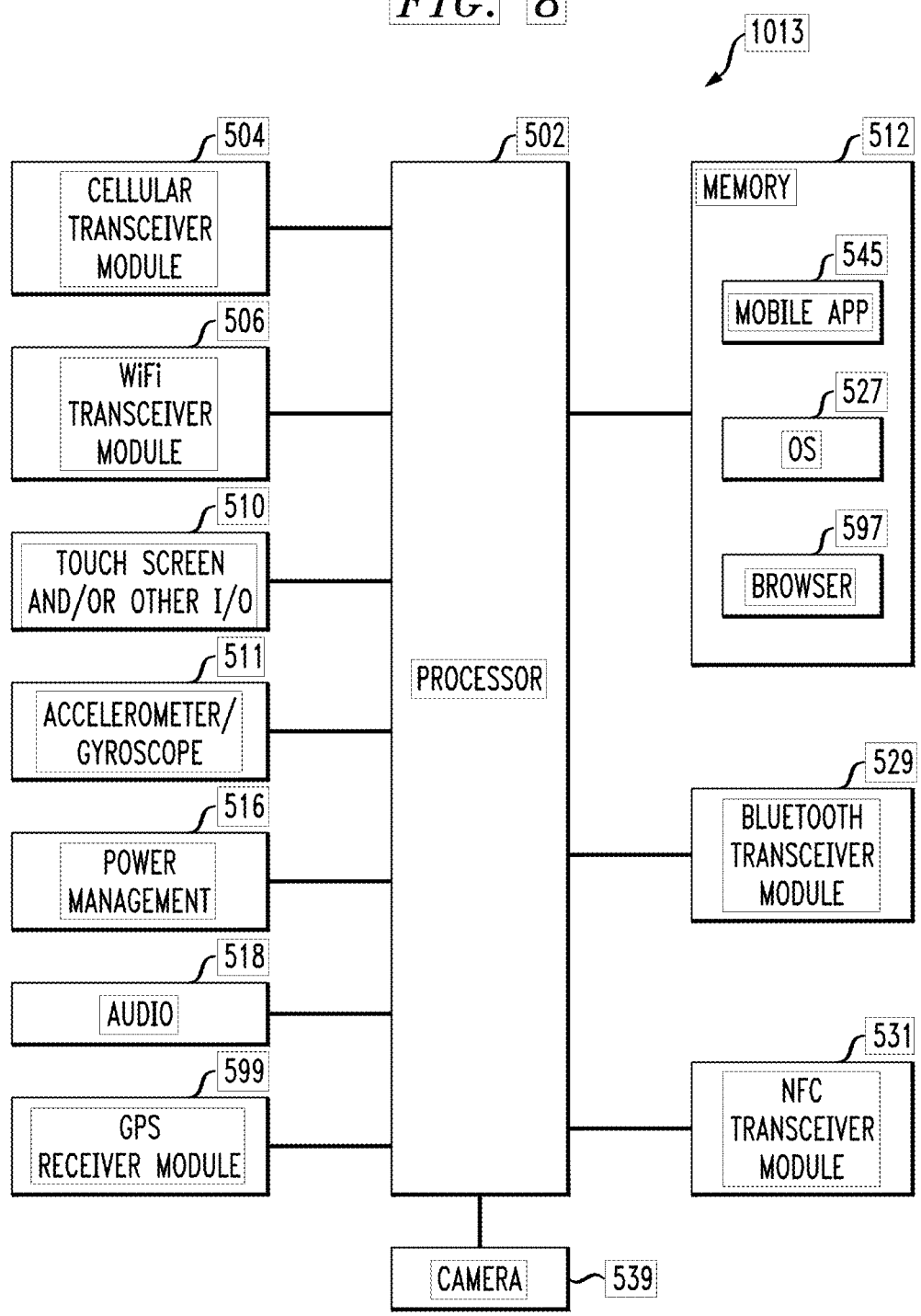
FIG. 8 is a block diagram of a "smart" phone or tablet computer useful in one or more embodiments of the invention.

FIG. 8 is a block diagram of an exemplary mobile electronic device such as a tablet computing device, netbook, laptop, or smart phone 1013 or the like, which can function as a cloud computing node and/or can include a camera, processor, and system 300. Unit 1013 includes a suitable processor; e.g., a microprocessor 502. A cellular transceiver module 504 coupled to processor 502 includes an antenna and appropriate circuitry to send and receive cellular telephone signals, e.g., 3G or 4G. In some cases, a Wi-Fi transceiver module 506 coupled to processor 502 includes an antenna and appropriate circuitry to allow unit 1013 to connect to the Internet via a wireless network access point or hotspot. The skilled artisan will appreciate that "Wi-Fi" is a trademark of the Wi-Fi Alliance and the brand name for products using the IEEE 802.11 family of standards. In some cases, a Bluetooth transceiver module 529 coupled to processor 502 includes an antenna and appropriate circuitry to allow unit 1013 to connect to other devices via the Bluetooth wireless technology standard. In some cases, an NFC transceiver module 531 coupled to processor 502 includes an antenna and appropriate circuitry to allow unit 1013 to establish radio communication via near-field communications.

Operating system (OS) 527 orchestrates the operation of unit 1013.

Touch screen 510 coupled to processor 502 is also generally indicative of a variety of input/output (I/O) devices such as a keypad, another type of display, a mouse or other pointing device, and so on, all of which may or may not be present in one or more embodiments. Audio module 518 coupled to processor 502 includes, for example, an audio coder/decoder (codec), speaker, headphone jack, microphone, and so on. Power management system 516 can include a battery charger, an interface to a battery, and so on. Memory 512 is coupled to processor 502. Memory 512 can include, for example, volatile memory such as RAM, and non-volatile memory such as ROM, flash, or any tangible computer-readable recordable storage medium which stores information in a non-transitory manner. Processor 502 will typically also have on-chip memory.

A digital camera 539 is coupled to processor 502 and will include the image receiver 302 in one or more embodiments.

A GPS receiver module 599 coupled to processor 502 includes an antenna and appropriate circuitry to allow device 1013 to calculate its position by precisely timing the signals sent by GPS satellites high above the Earth. Corresponding software resides in memory 512.

Note that elements in FIG. 8 are shown connected directly to processor 502; however, one or more bus structures can be employed in one or more embodiments. Furthermore, elements shown as implemented in software may be implemented at least in part in hardware for speed, if desired.

Browser program 597 in memory 512 deciphers hypertext markup language (html) served out by a server for display on screen 510 or the like.

An accelerometer and gyroscope 511 are coupled to the processor 502 in some cases. A barometric pressure transducer can be included in unit 511 or separately and coupled to processor 502 for altitude determination in connection with software in memory 512.

Application 545 in memory 512 can include aspects of system 300.

Every instance need not necessarily have every feature depicted in FIG. 5.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving the performance of a computer vision system, said method comprising:
    obtaining input specifying a task to be performed by said computer vision system;
    training said computer vision system to solve said task using a plurality of training images;
    determining whether current weather conditions are appropriate, based on weather conditions when at least one of said training images was taken;
    responsive to said determining indicating that said current weather conditions are not appropriate, recommending a subsequent time for obtaining a first digital image;
    obtaining said first digital image;
    comparing said first digital image to at least one of said training images used to train said computer vision system to solve said task;
    based on said comparing indicating that said first digital image is insufficiently similar to said at least one of said training images, recommending at least one adjustment to a configuration for photographically acquiring said digital image;
    photographically acquiring a second digital image in accordance with said adjustment; and
    performing said task with said computer vision system based on said second digital image obtained in accordance with said adjustment, wherein the recommended adjustment minimizes a difference between a histogram of the first digital image and at least one of the training images up to a first minimal threshold value and wherein the recommended adjustment minimizes a difference between a probability that the first digital image contains occluded objects and a same probability computed for the training images up to a second minimal threshold value.

2. The method of claim 1, wherein said first digital image is obtained at said subsequent time.

3. The method of claim 1, wherein said current weather conditions are measured by at least one of cloud cover, moisture, temperature, luminosity, and time of day.

4. The method of claim 1, wherein said first digital image is obtained in response to said determining indicating that said current weather conditions are appropriate.

5. The system of claim 1, further comprising associating said current weather conditions with said first digital image.

6. The method of claim 1, wherein said current weather conditions are measured by at least one of cloud cover, moisture, temperature, luminosity, and time of day.

7. The method of claim 1, wherein said input specifies at least one of crop identification, fruit counting, agricultural disease prediction, fruit size estimation, fruit quality estimation, fruit ripening estimation, crop pest identification, agricultural disease diagnosis, and leaf size estimation.

8. The method of claim 1, wherein said adjustment comprises at least one of pan, tilt, and zoom.

9. The method of claim 1, wherein recommending said at least one adjustment to said digital image comprises displaying directions to a human user operating at least one of a camera and an unmanned aerial vehicle.

10. The method of claim 1, wherein a camera is installed on an unmanned aerial vehicle and wherein said recommendation comprises a second recommendation to adjust at least one of pitch, yaw, roll, and translation for said unmanned aerial vehicle and wherein recommending said at least one adjustment to said digital image comprises wirelessly controlling said unmanned aerial vehicle.

11. A non-transitory computer readable medium comprising computer executable instructions which when executed by a computer cause the computer to perform a method for improving the performance of a computer vision system, said method comprising:
  obtaining input specifying a task to be performed by said computer vision system;
  training said computer vision system to solve said task using a plurality of training images;
  determining whether current weather conditions are appropriate, based on weather conditions when at least one of said training images was taken;
  responsive to said determining indicating that said current weather conditions are not appropriate, recommending a subsequent time for obtaining a first digital image;
  obtaining said first digital image;
  comparing said first digital image to at least one of said training images used to train said computer vision system to solve said task;
  based on said comparing indicating that said first digital image is insufficiently similar to said at least one of said training images, recommending at least one adjustment to a configuration for photographically acquiring said digital image;
  photographically acquiring a second digital image in accordance with said adjustment; and
  performing said task with said computer vision system based on said second digital image obtained in accordance with said adjustment, wherein the recommended adjustment minimizes a difference between a histogram of the first digital image and at least one of the training images up to a first minimal threshold value and wherein the recommended adjustment minimizes a difference between a probability that the first digital image contains occluded objects and a same probability computed for the training images up to a second minimal threshold value.

12. The non-transitory computer readable medium of claim 11, wherein said first digital image is obtained at said subsequent time.

13. A computer vision system comprising:
  a memory;
  an image receiver;
  at least one processor, coupled to said memory and said image receiver, and operative to:
    obtain input specifying a task to be performed by said computer vision system;
    train said computer vision system to solve said task using a plurality of training images;
    determine whether current weather conditions are appropriate, based on weather conditions when at least one of said training images was taken;
    responsive to said determining indicating that said current weather conditions are not appropriate, recommend a subsequent time for obtaining a first digital image;
    obtain said first digital image via said image receiver;
    compare said first digital image to at least one of said training images used to train said computer vision system to solve said task;
    based on said comparing indicating that said first digital image is insufficiently similar to said at least one of said training images, recommend at least one adjustment to a configuration for photographically acquiring said digital image;
    photographically acquire a second digital image, via said image receiver, in accordance with said adjustment; and
    perform said task with said computer vision system based on said second digital image obtained in accordance with said adjustment, wherein the recommended adjustment minimizes a difference between a histogram of the first digital image and at least one of the training images up to a first minimal threshold value and wherein the recommended adjustment minimizes a difference between a probability that the first digital image contains occluded objects and a same probability computed for the training images up to a second minimal threshold value.

14. The computer vision system of claim 13, wherein said first digital image is obtained at said subsequent time.

15. The computer vision system of claim 14, wherein said current weather conditions are measured by at least one of cloud cover, moisture, temperature, luminosity, and time of day.

16. The computer vision system of claim 13, wherein said first digital image is obtained in response to said determining indicating that said current weather conditions are appropriate.

17. The computer vision system of claim 16, wherein said at least one processor is further operable to associate said current weather conditions with said first digital image.

18. The computer vision system of claim 16, wherein said current weather conditions are measured by at least one of cloud cover, moisture, temperature, luminosity, and time of day.

19. The computer vision system of claim 13, wherein said input specifies at least one of crop identification, fruit counting, agricultural disease prediction, fruit size estimation, fruit quality estimation, fruit ripening estimation, crop pest identification, agricultural disease diagnosis, and leaf size estimation.

20. The method of claim 1, wherein said comparison is based on a difference between a probability that the first digital image contains occluded objects and a same probability computed for said at least one of said training images.

* * * * *